United States Patent [19]

Izumi

[11] Patent Number: 4,645,533
[45] Date of Patent: Feb. 24, 1987

[54] TANTALUM POWDER AND METHOD OF MAKING

[75] Inventor: Tomoo Izumi, Fukushima, Japan

[73] Assignee: Showa Cabot Supermetals K. K., Tokyo, Japan

[21] Appl. No.: 692,084

[22] Filed: Jan. 17, 1985

[30] Foreign Application Priority Data

Jan. 18, 1984 [JP] Japan ................. 59-5653

[51] Int. Cl.$^4$ .............................. B22F 9/24
[52] U.S. Cl. ............... 75/0.5 AB; 75/0.5 BB; 75/251
[58] Field of Search .......... 75/0.5 R, 0.5 AB, 0.5 BB, 75/251, 252, 254

[56] References Cited

U.S. PATENT DOCUMENTS 3,825,802  7/1974  Kumagai et al. .............. 317/230
4,009,007  2/1977  Fry .
4,356,028 10/1982  Bates .................... 75/0.5 AB

FOREIGN PATENT DOCUMENTS 55-113807  9/1980  Japan .
58-71614   4/1983  Japan .

Primary Examiner—Christopher W. Brody
Attorney, Agent, or Firm—Sughrue, Mion, Zinn, Macpeak & Seas

[57] ABSTRACT

The dielectric characteristic and resistance against the dielectric characteristic deterioration of tantalum powder for use in a solid electrolyte capacitor are improved by incorporating phosphorus and boron dopant sources into tantalum material at the reducing step of $K_2TaF_7$ or by incorporating one of the two dopant sources at the reducing step and the other dopant source at the heat-treating step.

6 Claims, No Drawings

TANTALUM POWDER AND METHOD OF MAKING

BACKGROUND OF THE INVENTION

1. Field of the Invention

The present invention relates to a method for producing a tantalum powder suitable for use for a sintered electrolytic capacitor. More particularly, the present invention relates to a tantalum powder which exhibits small shrinkage during sintering, a high specific electrostatic capacity, and improved reliability, e.g., life, over a conventional tantalum powder.

2. Description of the Related Art

It is known, for example, from U.S. Pat. No. 4,356,028, to produce tantalum powder by reducing potassium fluorotantalate or potassium tantalum fluoride salt under the presence of sodium, washing the yielded tantalum powder, heat-treating it in vacuum, then pulverizing it.

Tantalum powder has been recognized as an excellent material for producing sintered electrolytic capacitor. The powder must be of a high purity, i.e., have minimal impurities, since, it is believed, impurities present at the interface between the tantalum-oxide film, i.e., a dielectric material, and the tantalum powder body induce structural defects, increasing the leakage current or causing breakdown of the capacitor. The fact that high purity tantalum powder having minimal impurities is optimal for a capacitor, has continued to be affirmed.

To enhance the specific electrostatic capacity and hence to provide a high capacity tantalum powder, a dopant is currently added to the powder. U.S. Pat. No. 3,825,802 discloses a tantalum powder with a dopant selected from the group consisting of nitrogen silicon, phosphorus, and boron, and a capacitor made of the compressed tantalum powder. U.S. Pat. No. 3,825,802 also discloses mixtures of elements selected from nitrogen, silicon, phosphorus, and boron. A porous body of compressed particles is produced by compressing and sintering particles of a mixture of tantalum and dopant-containing material, e.g., TaN, until the particles are bonded into a rigid porous mass. The dopant material may be combined with a metal e.g., tantalum, capable of electrolytically forming a dielectric film on the surface of the metal.

As mentioned above, U.S. Pat. No. 3,825,802 discloses to use dopants, such as boron and phosphorus. The dopant material(s) disclosed in this patent are used, prior to or during the sintering operation, with a film-forming metal. Sufficient sintering for forming a porous electrode is carried out to diffuse the dopants through the porous mass of the particles.

U.S. Pat. No. 4,009,007 discloses that the electrical capacitance of the tantalum powder is improved by addition of phosphorus to the tantalum powder. It alleges that the electric capacitance is improved by adding phosphorus in an amount smaller than that disclosed in U.S. Pat. No. 3,825,802.

U.S. Pat. No. 4,356,028 states that U.S. Pat. Nos. 3,825,802 and 4,009,007 disclose dopants including phosphorus, but that no significant improvements are observed due to the small phosphorus content. U.S. Pat. No. 4,356,028 discloses a specific capacity of approximately 5000 $\mu$FV/g due to the addition of phosphorus to the reaction mix of $K_2TaF_7$ and NaCl ("in-situ doping method").

Japanese Unexamined Patent Publication (Kokai) No. 55-113807 discloses to improve the strength of a sintered anode and the specific electrostatic capacity and electrical properties of tantalum powder by means of incorporating one or more members selected from the group consisting of silicon, a calcium salt of silicon compound, and phosphate into the $K_2TaF_7$ bearing material. This publication, though not conclusively, describes the reason for the improvement as being that silicon or the like behaves as nuclei during the reduction of $K_2TaF_7$ to metallic tantalum. The method disclosed in this publication allegedly attains more uniform distribution of a dopant(s) in the tantalum powder than is attained by the method disclosed in U.S. Pat. No. 3,825,802.

Japanese Unexamined Patent Publication (Kokai) No. 58-71614 discloses a tantalum powder containing up to 0.5% by weight of boron or a boron compound.

Except for U.S. Pat. No. 3,825,802, the prior arts generally disclose an improvement in the relative specific capacity of the tantalum powder and a reduction in the leakage current during a so-called wet, anodic-oxidation process in aqueous electrolyte, for producing dielectric tantalum powder.

The prior patent publications do not recognize that a plurality of dopants, especially those incorporated in the starting material of a reducing operation for forming tantalum powder, leads to an improvement of the dielectric properties of the tantalum powder over a tantalum powder with a single dopant. Especially, the prior publications do not recognize that, when solid electrolyte capacitors produced using their doped tantalum powder are tested for reliability under a life test, their properties greatly deteriorate as compared with those produced using nondoped tantalum powder. In this regard, U.S. Pat. No. 3,825,802 described in Table 1 the life test of capacitors having a relative specific capacity in the range of from approximately 3300 to 3500 $\mu$FV/g. Along with recent trends and demands for enhancing the specific capacity of tantalum powder, the life test of powder having a high relative specific capacity has become crucial.

SUMMARY OF THE INVENTION

The present inventor discovered that a tantalum powder capable of producing a capacitor having both an improved specific electrostatic capacity and life of the resultant sintered electrolytic capacitor can be obtained by incorporating a plurality of dopants into the tantalum or the tantalum-containing material at a specified stage or stages of the method for producing a tantalum powder.

It is therefore an object of the present invention to provide a method for producing a tantalum powder in which both a high specific electrostatic capacity and a long life are achieved.

According to the present invention, there is provided a method for producing a tantalum powder, including the successive steps of: reducing potassium fluorotantalate by metallic sodium under the presence of a diluent to yield unrefined tantalum powder; washing; heat-treating; and fine crushing. At least one boron component, which consists of at least one member selected from the group consisting boron and a boron compound, and at least one phosphorus component, which consists of at least one member selected from the group consisting of phosphorus and a phosphorus compound are used as doping sources. The reduction of potassium fluorotantalate is conducted under the presence of the dopant sources. Alternatively, the reduction of potassium fluorotantalate is conducted under the presence of at least one of the dopant sources, and at least the other dopant source is brought into inseparable contact with the heat-treated tantalum powder. In this specification, "heat-treated tantalum powder" indicates tantalum powder which is and is being heat-treated by a known method, in which hydrogen gas and the like are degassed and tantalum powder agglomerates. The stages between the heat treatment and the sintering can be appropriately called as an "as-heat-treated" stage, since the tantalum powder maintains the heat-treated properties which are not affected essentially by intermediate treatment such as drying. The tantalum powder may therefore be referred to as the "as-heat-treated" between the heat treatment and sintering stages.

Also, in this specification, "inseparable contact" means that at least the other dopant source and tantalum powder form an inseparable mass so that the dopant source does not separate from the tantalum powder at steps subsequent to formation of such a mass. The formation of such an inseparable mass is carried out by means of mixing the other dopant source with the tantalum powder before the heat treatment and then heating the mixture. Alternatively, the tantalum powder is brought into contact with a solution of the dopant source after the heat treatment.

Although the present invention is not restricted as to how the at least other dopant source behaves in the heat-treated tantalum powder, that dopant diffuses into the heat-treated powder when the heat treatment is conducted under the presence of that dopant source. When the dopant source is brought into inseparable contact with the heat-treated tantalum powder after the heat treatment, the dopant is deposited on the tantalum powder and diffuses into the tantalum powder during sintering.

DESCRIPTION OF THE PREFERRED EMBODIMENTS

In the method of the present invention, a phosphorus or phosphorus compound (hereinafter collectively referred to as the phosphorus component) and boron or a boron compound (hereinafter collectively referred to as the boron component) are added in the reducing stage of potassium fluorotantalate. Alternatively, one of the phosphorus component and boron component is added in the reducing stage of potassium fluorotantalate, and the other is added to the tantalum powder between the heat-treatment stage and sintering stage.

In order to produce tantalum powder doped with both a phosphorus component and boron component, the doping is carried out in a specified step or steps for producing the tantalum powder. The steps for producing the tantalum powder include, as is known, reducing the potassium fluorotantalate by metallic sodium under the presence of diluent into tantalum unrefined powder, washing the tantalum unrefined powder, heat treating the powder, and finely crushing the heat-treated powder. The heat treatment is carried out preferably under a vacuum degree of $10^{-3}$ Torr or less. The reduction is preferably carried out under an inert gas atmosphere.

The phosphorus component and boron component synergistically improves the life of a capacitor when they are preliminarily incorporated in the raw materials of the sodium reduction.

It was surprisingly found that when the phosphorus component and boron component are not present in the raw materials for the sodium reduction but in the tantalum powder subjected to heat treatment, no appreciable improvement in the life of a capacitor was attained despite the copresence of the phosphorus component and boron component.

The phosphorus component and boron component also synergistically improve the life of a capacitor when one of them is preliminarily incorporated in the raw materials for sodium reduction and the other is added to the tantalum powder before the heat treatment, or to the tantalum powder "as-heat-treated". Both the sodium reduction and the heat treatment may be carried out under the presence of the phosphorus component and boron component. In addition to this, various methods for adding the phosphorus component and boron component are possible, for example; one of the phosphorus component and boron component is incorporated into the raw materials of the sodium reduction and both are added to the tantalum powder upon heat treatment or both the phosphorus component and boron component are incorporated into the raw materials for sodium reduction and one of them is added to the tantalum powder before the heat treatment or to the tantalum powder "as-heat treated".

The phosphorus compound is preferably selected from the group consisting of $P_2O_5$, $Ca_3(PO_4)_2$, and $H_3PO_4$. The boron compound is preferably selected from the group consisting of $H_3BO_3$, $KBF_4$, $NH_3BO_3$, $Na_3BO_3$, $B_2O_3$, $NH_4BF_4$, and $NaBF_4$.

These compounds are selected as those appropriately exhibiting a synergistic effect due to boron and phosphorus. The phosphorus component and boron component are added to the raw materials and/or tantalum powder in a minor but effective amount for attaining a synergistic effect due to the copresence thereof. However, when the amount is exceedingly great, the characteristics of the metallic tantalum are lost, especially affecting the capacitor's reliability. The preferable amount of phosphorus component to be added to the raw materials and/or tantalum powder to be heat-treated is 10 ppm to 600 ppm in terms of P based on million parts of tantalum. The preferable amount of the boron component added to the raw materials and/or tantalum powder to be heat-treated is 10 ppm to 500 ppm in terms of boron based on million parts of tantalum. For example, 60 g of $P_2O_5$ and 15 g of $KBF_4$ may be added to 100 kg of $K_2TaF_7$ or 1 to 500 g $KBF_4$ may be added to the tantalum material at one of the reduction and heat-treatment steps. From 1 to 500 g of $P_2O_5$ may be added to the tantalum material at the other of the reduction and heat-treatment steps.

The present invention will now be explained by way of examples.

EXAMPLE 1

Potassium fluorotantalate ($K_2TaF_7$) in an amount of 50 kg was mixed with 25 kg of sodium chloride, 100 g of potassium borofluoride ($KBF_4$), and 40 g of calcium phosphate ($Ca_3(PO_4)_2$). The mixture was melted. Potassium fluorotantalate was reduced at 800° C. by sodium. The mixture was cooled, roughly crushed, and washed with water and then with acid. The washed powder was sieved to yield fine powder. The powder was heat-treated at 1200° C. The heat-treated powder was finely crushed. This powder is referred to as powder A.

EXAMPLE 2

$KBF_4$ in an amount of 100 g was added to 50 kg of $K_2TaF_7$ and 25 kg of NaCl. $K_2TaF_7$ was reduced by metallic sodium at 700° C. to yield fine tantalum powder. Phosphorus pentoxide ($P_2O_5$) in an amount of 15 g was added to the total of the fine tantalum powder prior to the heat treatment. The heat treatment of this tantalum powder was carried out at 1200° C. under the presence of $P_2O_5$. The heat treated powder was finely crushed to obtain the refined Ta powder. This powder is referred to as powder B.

EXAMPLE 3

$P_2O_5$ in an amount of 20 g was added to 50 kg of $K_2TaF_7$ and 25 kg of NaCl. $K_2TaF_7$ was reduced by metallic sodium at 800° C. to yield fine tantalum powder. The heat treatment of the tantalum powder was carried out at 1200° C. Borax ($Na_3BO_3$) in an amount of 80 g was dissolved with water. The heat-treated powder was thoroughly mixed with an aqueous borax solution, then dried and crushed. The so obtained powder is referred to as powder C.

COMPARATIVE EXAMPLE 1

A mixture of 50 kg of $K_2TaF_7$ and 25 kg of NaCl was heated to 800° C. to reduce $K_2TaF_7$ by metallic sodium and to yield fine tantalum powder. Phosphorus pentoxide ($P_2O_5$) in an amount of 15 g and boric acid ($H_3BO_3$) in an amount of 80 g were mixed with the total of the fine tantalum powder. The heat treatment of this mixture was carried out at 1200° C. under the presence of $P_2O_5$ and $H_3BO_3$. The heat-treated powder was finely crushed to obtain the tantalum powder. This powder is referred to as powder D.

COMPARATIVE EXAMPLE 2

$KBF_4$ in an amount of 100 g was added to 50 kg of $K_2TaF_7$ and 25 kg of NaCl. $K_2TaF_7$ was reduced by metallic sodium at 800° C. to yield fine tantalum powder. The heat treatment of this tantalum powder was carried out at 1200° C. The heat-treated powder was finely crushed to obtain the tantalum powder. This powder is referred to as powder E.

COMPARATIVE EXAMPLE 3

The same procedures as in Comparative Example 2 were repeated except that, instead of 100 g of KBF4, 40 g of $Ca_3(PO_4)_2$ was used. The tantalum powder obtained by this example is referred to as powder F.

COMPARATIVE EXAMPLE 4

The powder E obtained in Comparative Example 2 and powder F obtained in Comparative Example 3 were mixed in an equal amount. The obtained powder is referred to as powder G.

COMPARATIVE EXAMPLE 5

A mixture of 50 kg of $K_2TaF_7$ and 25 kg of NaCl was heated to 800° C. to reduce $K_2TaF_7$ by metallic sodium and to yield fine tantalum powder. The heat treatment of this tantalum powder was carried out at 1200° C. The heat-treated powder was finely crushed to obtain the tantalum powder. This powder is referred to as powder H.

One gram of each of the powders A, B, C, D, E, F, G, and H was taken and compressed to produce a green compact having a density of 6.5 g/cm³. The green compacts of the above powders were sintered at 1600° C. for 30 minutes and then anodic oxidized by a known wet process. The properties of the anodic oxidized tantalum anode were measured. The results of measurement are given in Table 1.

TABLE 1

| Powder | Adding step and kind of dopant(s) Reducing step | Adding step and kind of dopant(s) Heat-treatment step | Specific electrostatic capacity [CV] (μFV/g) | Leakage current [LC] (μA/g) | Breakdown voltage [SV] (V) |
|---|---|---|---|---|---|
| A | B.P | — | 13500 | 2.5 | 126 |
| B | B | P | 13600 | 3.2 | 115 |
| C | P | B | 13300 | 3.5 | 118 |
| D | — | B.P | 11100 | 2.8 | 117 |
| E | B | — | 12000 | 2.2 | 125 |
| F | P | — | 11700 | 3.3 | 113 |
| G (Mix. of E, F) | — | — | 11800 | 3.2 | 115 |
| H | — | — | 7400 | 21.1 | 131 |

The above-mentioned powders were further taken in an amount ranging from 70 to 140 mg taking into consideration the CV values shown in Table 1 so that pellets having a CV value of approximately 1000 μFV per pellet were obtained. The powders were compressed to form green compacts having a density of 6.5 g/cm³. The green compacts were sintered at 1600° C. for 30 minutes to produce pellets. The pellets were anodic oxidized at a primary voltage of 100 V and subsequently subjected to conventional solid-processing steps for connecting the electrodes to the tantalum pellets. The encased solid-electrolyte capacitors had a rating of 25 Vw × 10 μF. The initial characteristics of the solid electrolyte capacitors were measured. The solid electrolyte capacitors were then subjected to a life test under a direct current of 32.5 V applied for 1000 hours at 85° C.

The results are given in Table 2.

TABLE 2

| Powder | Initial characteristics C (μF) | Initial characteristics LC (μA) | Life test LC (μA) | Life test Percentage of short-circuits |
|---|---|---|---|---|
| A | 10.2 | 0.02 | 0.06 | 2 |
| B | 10.1 | 0.02 | 0.08 | 2 |
| C | 10.1 | 0.02 | 0.10 | 3 |
| D | 10.2 | 0.03 | 0.85 | 30 |
| E | 10.0 | 0.04 | 0.53 | 35 |
| F | 9.9 | 0.03 | 0.83 | 40 |
| G | 10.0 | 0.04 | 0.42 | 28 |
| H | 11.3 | 0.02 | 0.07 | 3 |

As is apparent from Tables 1 and 2, the combined doping according to the present invention is outstandingly effective for enhancing the specific electrostatic capacitance and for lessening, at the life test, the leakage current and occurrence of short-circuiting. On the other hand, the combined doping of boron and phosphorus according to the comparative examples (powders D, G) does not attain at all the effects attained by the present invention. Thus, the dopants boron and phosphorus need to be added to the tantalum material at the specified steps to attain the effects thereof. It is to be noted that the combined doping of boron and phosphorus according to the comparative example using the powder G does not contribute to improvement in the life of a solid electrolyte capacitor.

I claim:

1. A method for producing tantalum powder, comprising the successive steps of: (1) reducing potassium fluorotantalate with metallic sodium in the presence of a diluent to yield unrefined tantalum powder; (2) washing the unrefined tantalum powder to yield tantalum powder; (3) heat-treating the tantalum powder; and (4) fine crushing the tantalum powder, wherein at least one boron component and at least one phosphorus component are used as doping sources; and wherein the reducing of the poatassium fluorotantalate (1) is conducted in the presence of both of said dopant sources, or the reducing of the potassium fluorotantalate is conducted in the presence of one of the dopant sources and the other of the dopant sources is brought into inseparable contact with the heat-treated tantalum powder.

2. A method according to claim 1, wherein said at least one boron component is selected from the group consisting of $H_3BO_3$, $KBF_4$, $NH_3BO_3$, $Na_3BO_3$, $B_2O_3$, $NH_4BF_4$, and $NaBF_4$.

3. A method according to claim 1, wherein said phosphorus component is selected from the group consisting of $P_2O_5$, $Ca_3(PO_4)_2$, and $H_3PO_4$.

4. A method according to claim 1, wherein the process comprises conducting the reducing of the potassium fluorotantalate in the presence of one of the dopant sources, and said process comprises adding the other dopant source to the tantalum powder before the heat treatment.

5. A method according to claim 1, wherein said at least other dopant source is added to the tantalum powder as heated-treated.

6. A powder for a solid electrolyte capacitor consisting of powder produced by the method according to claim 1, 2, 3, 4, or 5, having a specific electrostatic capacity of 10,000 $\mu FV/g$ or more and short circuits of approximately 3% or less, when tested under a life test of a direct current of 32.5 V applied for 1000 hours at 85° C.

* * * * *